United States Patent
Linder et al.

(10) Patent No.: US 7,356,013 B2
(45) Date of Patent: Apr. 8, 2008

(54) METHOD AND SYSTEM FOR MOBILE IP NODES IN HETEROGENEOUS NETWORKS

(75) Inventors: Jan Linder, Bern (CH); Marc Danzeisen, Bern (CH)

(73) Assignee: Swisscom Mobile AG, Bern (CH)

( * ) Notice: Subject to any disclaimer, the term of this patent is extended or adjusted under 35 U.S.C. 154(b) by 708 days.

(21) Appl. No.: 10/481,088

(22) PCT Filed: Jun. 12, 2002

(86) PCT No.: PCT/CH02/00311

§ 371 (c)(1),
(2), (4) Date: Dec. 17, 2003

(87) PCT Pub. No.: WO02/103978

PCT Pub. Date: Dec. 27, 2002

(65) Prior Publication Data

US 2004/0176023 A1 Sep. 9, 2004

(30) Foreign Application Priority Data

Jun. 18, 2001 (CH) .................................. 01810594

(51) Int. Cl.
*H04Q 7/24* (2006.01)
(52) U.S. Cl. ....................................... 370/338; 370/465
(58) Field of Classification Search ..................... None
See application file for complete search history.

(56) References Cited

U.S. PATENT DOCUMENTS 5,918,016 A 6/1999 Linn et al.

(Continued)

FOREIGN PATENT DOCUMENTS

EP 0 891 061 1/1999

(Continued)

OTHER PUBLICATIONS

U.S. Appl. No. 10/171,592, filed Jun. 17, 2002, Linder et al.

(Continued)

*Primary Examiner*—Huy D. Vu
*Assistant Examiner*—Rhonda Murphy
(74) *Attorney, Agent, or Firm*—Oblon, Spivak, McClelland, Maier & Neustadt, P.C.

(57) ABSTRACT

A recording medium including computer program instructions which cause a computer to execute a method of assigning IP addresses to mobile IP nodes in heterogeneous networks in which a home agent dynamically assigns a temporary IP care-of address to a static IP home address when the mobile node is moved in the heterogeneous networks, the dynamic care-of address indicating the topologically current network location of the mobile node and IP data packets having the IP home address of the mobile node as a destination address being redirected to the care-of address of the mobile node, including checking the mobile node for available physical network interfaces, generating a lookup table with the available and configurable physical network interfaces, linking to one of the available physical network interfaces, accessing the heterogeneous networks via a permanent virtual IP network interface generated in the mobile node, the generated permanent virtual IP network interface being linked to the current network, and including a generated virtual L3 layer and a generated virtual L2 layer and updating, during a change of the physical network interface of the mobile node, the link of the permanent virtual IP network interface to the network based on the lookup table.

6 Claims, 7 Drawing Sheets

U.S. PATENT DOCUMENTS

| | | | |
|---|---|---|---|
| 6,501,746 B1 * | 12/2002 | Leung | 370/338 |
| 6,681,259 B1 * | 1/2004 | Lemilainen et al. | 709/250 |
| 7,079,504 B1 * | 7/2006 | Leung et al. | 370/312 |
| 2002/0194385 A1 | 12/2002 | Linder et al. | |
| 2003/0018810 A1 * | 1/2003 | Karagiannis et al. | 709/238 |
| 2003/0182431 A1 * | 9/2003 | Sturniolo et al. | 709/227 |

FOREIGN PATENT DOCUMENTS

| | | |
|---|---|---|
| EP | 0 998 094 | 5/2000 |
| EP | 1 089 495 | 4/2001 |
| EP | 1 271 896 A2 | 1/2003 |

OTHER PUBLICATIONS

U.S. Appl. No. 10/481,088, filed Dec. 17, 2003, Linder et al.

* cited by examiner

METHOD AND SYSTEM FOR MOBILE IP NODES IN HETEROGENEOUS NETWORKS

BACKGROUND OF THE INVENTION

1. Field of the Invention

This invention relates to a method for mobile IP nodes in heterogeneous networks in which a home agent dynamically assigns a temporary IP care-of address to a static IP home address when the mobile node is moved in the heterogeneous networks, the dynamic care-of address indicating the topologically current network location of the mobile node and IP data packets having the IP home address of the mobile node as destination address being redirected to the care-of address of the mobile node. In particular, the invention relates to a method for mobile nodes in heterogeneous networks with real-time applications.

2. Description of the Related Art

In the last few years, the number of Internet users worldwide and thus the information offered there has increased exponentially. Although the Internet offers access to information worldwide, we normally have no access to it, however, until we have arrived at a particular network access point, such as e.g. an office, school, university or at home. The growing range of IP-capable mobile devices, such as e.g. PDAs, mobile radio telephones and laptops, is beginning to change our concept of the Internet. An analogous transition from fixed nodes in networks to flexible requirements through increased mobility has only just begun. In mobile telephony, for example, this tendency has also manifested itself inter alia in new standards such as WAP, GPRS or UMTS. To understand the difference between the current reality and the IP linking possibilities of the future, one can call to mind, as a comparison, the development of telephony in the direction of mobility in the last twenty years.

Mobile computer use must not be confused with computer use and network capability as we know them today. With mobile network use, an existing IP access to applications on the mobile node should not be interrupted when the user changes his location in the network. On the contrary, all changes of link and interface e.g. during a change into different networks (Ethernet, mobile radio network, WLAN, Bluetooth, etc.) should be able to take place automatically and not interactively, so that the user does not even need to know about them. This also applies to a change of interface e.g. during the use of real-time applications. Real mobile IP computing has many advantages based on a stable access to the Internet at all times. With such an access, work can be done freely and independently of a desk. The requirements for mobile nodes in networks differ in many ways, however, from the mentioned development in mobile radio technology. The end points in mobile radio communication are usually people. With mobile nodes, however, computer applications can carry out interactions between different network participants without any human assistance or intervention. Enough examples therefor are to be found in airplanes, on ships or in automobiles. Thus mobile computing in particular with Internet access together with other applications, such as e.g. in combination with position determining devices, such as the satellite-based GPS (Global Positioning System), can be useful.

One of the problems with mobile network access via Internet Protocol (IP) is that the IP used for routing the data packets from the source address to the destination address in the network uses so-called IP addresses (IP: Internet Protocol). These addresses are assigned to a fixed location in the network, similar to how the telephone numbers of the fixed network are assigned to a physical jack. When the destination address of the data packets is a mobile node this means that a new IP network address must be assigned with each change of network location, which makes impossible transparent, mobile access. These problems were solved by the mobile IP standard (IETF RFC 2002, October 1996) of the Internet Engineering Task Force (IETF) in that mobile IP allows the mobile node to use two IP addresses. One of these addresses is the normal, static IP address (home address), which indicates the location of the home network, whereas the second is a dynamic IP care-of address, which designates the current location of the mobile node in the network. The assignment of the two addresses allows the IP data packets to be rerouted to the correct, momentary address of the mobile node.

Not all the problems of mobile network use are solved with the mobile IP of the IETF, however. If, for instance, a user would like to switch between two different network interfaces while an IP application is running, the IP connection is interrupted at the moment when he leaves the old network link. This connection is interrupted at least until at the mobile node the new link to the network has been made and until the new location, i.e. the new care-of address, is known and has been registered at the so-called home agent. The home agent is normally a fixed network node, which administers the two addresses of the mobile node (home address and care-of address) and reroutes or routes the corresponding data packets. If the interruption time for the change exceeds the time-out delays specified e.g. in the TCP (Transfer Control Protocol) for dead times, the IP connection is interrupted of course anyway. Even when the interruption time lies within the time-out delays specified in the TCP, however, the IP applications are not able to maintain the connection if a physical network interface is not permanently available. Examples of this are the change of the network card in a mobile node (e.g. a portable PC) having only one available card plug-in for the physical network interfaces. In the case of such a change of physical network interface, the IP applications or respectively the kernel receive the message that no physical network device can be assigned any longer to the IP data tunnel, and cut off the connection. This leads to the IP applications having to be restarted normally after change of network card in order to be able to access a particular IP data tunnel. Another problem is that, on the side of the mobile node, the data packets get lost in downtime between the connections since no physical network device is assigned anymore. Not only does this result in a loss of data, but it also causes the transmission rate of the IP packets through the IP applications to be slowed down corresponding to the duration of the downtime. As soon as the new connection has been made, the transmission rate is increased, at first only step-by-step, however. This slows down the IP application unnecessarily with every change of interface or location.

Network interfaces are traditionally divided up into different layers. Of interest for the present invention are the lowermost layers. A distinction is made between layer 1 (L1), which corresponds to the physical network interface (e.g. the network interface card NIC), layer 2 (L2) at which an initial recognition and identification of the interface through software is made possible, and layer 3 (L3) as IP layer (IP: Internet Protocol), at which level the distinction between different IP network links for software applications of the system takes place as well as the connection of the IP applications to the IP network interface. Further layers can be defined above the L3, such as e.g. a TCP (Transfer Control Protocol) layer, etc. Different physical network interfaces can also have different L2. Thus a distinction is made between packet-switched and circuit-switched interfaces. Each node of a network, for example, normally has a packet-switched interface with an unambiguous network address, these network addresses being called Data Link Control (DLC) address or Media Access Control (MAC) address. In the case of networks which conform to the IEEE 802 standard (IEEE: Institute of Electrical and Electronics Engineers) (such as e.g. Ethernet), the DLC addresses are usually called MAC addresses. To be called a DLC address, an address must fulfill at least the OSI (OSI: Open System Interconnection) reference model of the ISO (International Organization for Standardization) standards. The OSI reference model defines a 7-layer framework for implementation of network protocols. In other words, a DLC address, or respectively a MAC address, is a hardware address that identifies the node or respectively the physical network interface unambiguously in the network. Some protocols, such as e.g. Ethernet or Token Ring use. the DLC/MAC address exclusively, i.e. they cannot communicate with the respective node without this address. A circuit-switched interface, on the other hand, has no such DLC or MAC address, i.e. thus also no corresponding identification DLCI (DLC Identifier). Examples of protocols using circuit-switched interfaces are inter alia PPP (Point to Point Protocol), SLIP (Serial Line Internet Protocol) or GPRS (Generalized Packet Radio Service).

One solution for the above-mentioned drawbacks of the state of the art is disclosed in the European patent publication EP 1 089 495 of the company Nortel Networks Limited. EP 1 089 495 shows a system and a method in which it is possible, under certain circumstances, to make a change of the physical interfaces without the active IP applications being interrupted on the computer or having to be restarted because their link to the original interface has been lost. Nortel proposes thereby a so-called Network Access Arbitrator (NAA). The NAA sees to it that the various MAC addresses of the individual configurable physical network interfaces are rerouted via a single fixed MAC address of the so-called primary NIC. The NAA connects the L2 layer of the available NICs in that it reroutes the data packets from the primary NIC to the corresponding MAC address of a further network interface (secondary NIC). No virtual interface is thereby generated, however, but instead the NAA reroutes the MAC address via the first interface with a MAC address of the primary NIC to another (virtual adapter driver). It is an intrinsic part of this prior art invention that for the NAA at least one physical interface with a MAC address must be permanently available since the NAA otherwise loses its function. This can be a drawback, however, in the case of mobile devices, such as laptops, etc., if they possess e.g. only one slot for insertion of a PCMCIA network card. If the one network card is removed in order to switch to another network technology (e.g. Ethernet with fixed network to wireless), the Nortel invention no longer works. The same applies if, by accident, the user removes the network interface (primary NIC) via which the NAA reroutes the further MAC addresses. A further disadvantage of the Nortel invention is that it is sensitive to the definition or the standard of the hardware-related network address of the network interface. If the address e.g. does not correspond to the IEEE 802 standard (MAC addresses) and if the new address standard has not been explicitly defined beforehand in the NAA, the NAA does not function with these interfaces since it can no longer reroute the MAC addresses. This makes the Nortel invention inflexible since new standards cannot be recognized dynamically. A disadvantage which is at least just as big also arises from the explicit use of the MAC addresses. Circuit-switched interfaces do not have any corresponding MAC or network addresses. Since the NAA is only able to register devices with MAC addresses in order to reroute the data packets, circuit-switched interfaces are not available to the NAA even through their connection to the IP layer should also be possible.

SUMMARY OF THE INVENTION

It is an object of this invention to propose a new method for mobile IP nodes in heterogeneous networks. In particular the switching from one network connection to another should be able to be carried out without interruption of the IP applications and make possible an uninterrupted continuation of the program course also with real-time applications, if applicable, without being dependent upon specific protocols or network technologies.

These objects are attained according to the present invention through the elements of the independent claims. Further preferred embodiments follow moreover from the dependent claims and from the description.

In particular, these objects are achieved through the invention in that a home agent dynamically assigns a temporary IP care-of address to a static IP home address when the mobile node is moved in the heterogeneous networks, the dynamic care-of address indicating the topologically current network location of the mobile node and IP data packets having the IP home address of the mobile node as destination address being rerouted to the care-of address of the mobile node, in that an interface administration module of the mobile node checks the mobile node for available physical network interfaces, draws up a lookup table with the available and configurable physical network interfaces, and links itself to one of the available physical network interfaces, in that one or more IP applications of the mobile node access the heterogeneous networks via a virtual IP network interface generated in the mobile node, the generated permanent virtual IP network interface comprising a generated virtual L3 layer and a generated virtual L2 layer and being linked to the current network via the interface administration module, and during a change of the physical network interface of the mobile node the link of the permanent virtual IP network interface to the network is updated based on the lookup table by means of the interface administration module. In particular, the change of the physical network interface can comprise a change within different networks, such as e.g. Ethernet, Bluetooth, mobile radio networks (GSM: Global System for Mobile Communication, UMTS: Universal Mobile Telephone System, etc.) or WLAN (Wireless Local Area Network), or also a topological location change within the same network, for example with direct link to the Ethernet. An advantage of the invention is that a change of connection or interface of the mobile node in the network does not lead to an interruption of the IP applications, but instead these applications continue to run without any assistance from the user since the virtual interface remains as the permanent interface with respect to the IP applications. In contrast to the state of the art, a genuine virtual network interface is generated on the L2/L3 layer with the solution proposed here, and not a rerouting of network addresses by means of an existing network address, e.g. a MAC address. This has the advantage that even with removal of all available physical network interfaces (NIC), an interruption of the running IP applications does not occur. Protocols such as Ethernet or Token Ring use the DLC addresses directly. The IP protocol (likewise of course in combination with TCP as TCP/IP), on the other hand, uses a logical address on its network layer level in order to identify a node of the network. These are translated into DLC addresses only in a lower layer. Since the present invention generates a virtual network interface directly after the IP layer, it has precisely the advantage that it is able to maintain the connection of the IP applications completely independently of changes in the lower layers (L2 layer/L1 layer). This relates not only to the mentioned case where all physical network interfaces (NIC) are removed. The present invention is also independent of the standard of the network addresses (e.g MAC or DLC addresses) of the network interfaces used, and moreover can also handle the change between packet-switched and circuit-switched interfaces without any difficulty. In particular, should the standard be changed, this solution does not need to be adapted since it uses the logical address of the IP layer and not the hardware network addresses. Thus the access to a higher level of abstraction, i.e. of layers, has the advantage that one is independent of standards such as e.g. hardware addresses.

In an embodiment variant, the interface administration module checks the mobile node for available physical network interfaces periodically. This embodiment variant has the advantage that the lookup table is always kept in the most updated state and is immediately available. In particular, through the constant monitoring of the physical network interfaces and their features, changes can be made automatically, for instance, when physical network interfaces are available With better transmission options than the one momentarily active. As an embodiment variant, it is also possible to allow the criteria for automatic change of the physical interface to be determined by the user. This has the advantage that, among other things, the user is able to configure the virtual interface in a very individual way in keeping with his needs.

In an embodiment variant, the virtual interface changes and updates the physical interface automatically via the interface administration module based on information from the lookup table. As an embodiment variant, the change can also take place automatically based on criteria which can be set by the user. This has the advantage that, depending upon the defined criterion, the mobile node always automatically uses the physical interface with e.g. the greatest available data throughput at the moment or with the best cost/performance ratio.

In a further embodiment variant, the available physical network interfaces are dynamically configured. This has the advantage, among other things, that possibly available services such as e.g. a DHCP (Dynamic Host Configuration Protocol) service can be used and the handling is simplified for the user through the automation of the configuration.

In another embodiment variant, the available physical network interfaces are statically configured. This has the advantage, among other things, that the configuration of the network interfaces is controllable and easily comprehensible for the user.

With all the above-mentioned embodiment variants, it is also possible, in a supplementary embodiment variant, to buffer outgoing IP data packets in a data buffer of the mobile node in case the network connection of the mobile node is interrupted so that the output data rate of the one or more IP applications is maintained or is kept within a particular fluctuation tolerance. The advantage of this embodiment variant is inter alia that with a change of the physical interface the output data rate of an IP application can thus be kept constant or within a pre-given fluctuation tolerance as long as the storage capacity of the data buffer suffices for storing the outgoing data packets. This has once again the advantage that the IP data throughput rate is not brought down through the IP applications or the kernel during an interruption.

It should be stated here that, besides the method according to the invention, the present invention also relates to a system for carrying out the method.

BRIEF DESCRIPTION OF THE DRAWINGS

Embodiment variants of the present invention will be described in the following with reference to examples. The examples of the embodiments are illustrated by the following attached figures.

DETAILED DESCRIPTION OF THE PREFERRED EMBODIMENTS

Figure 1:
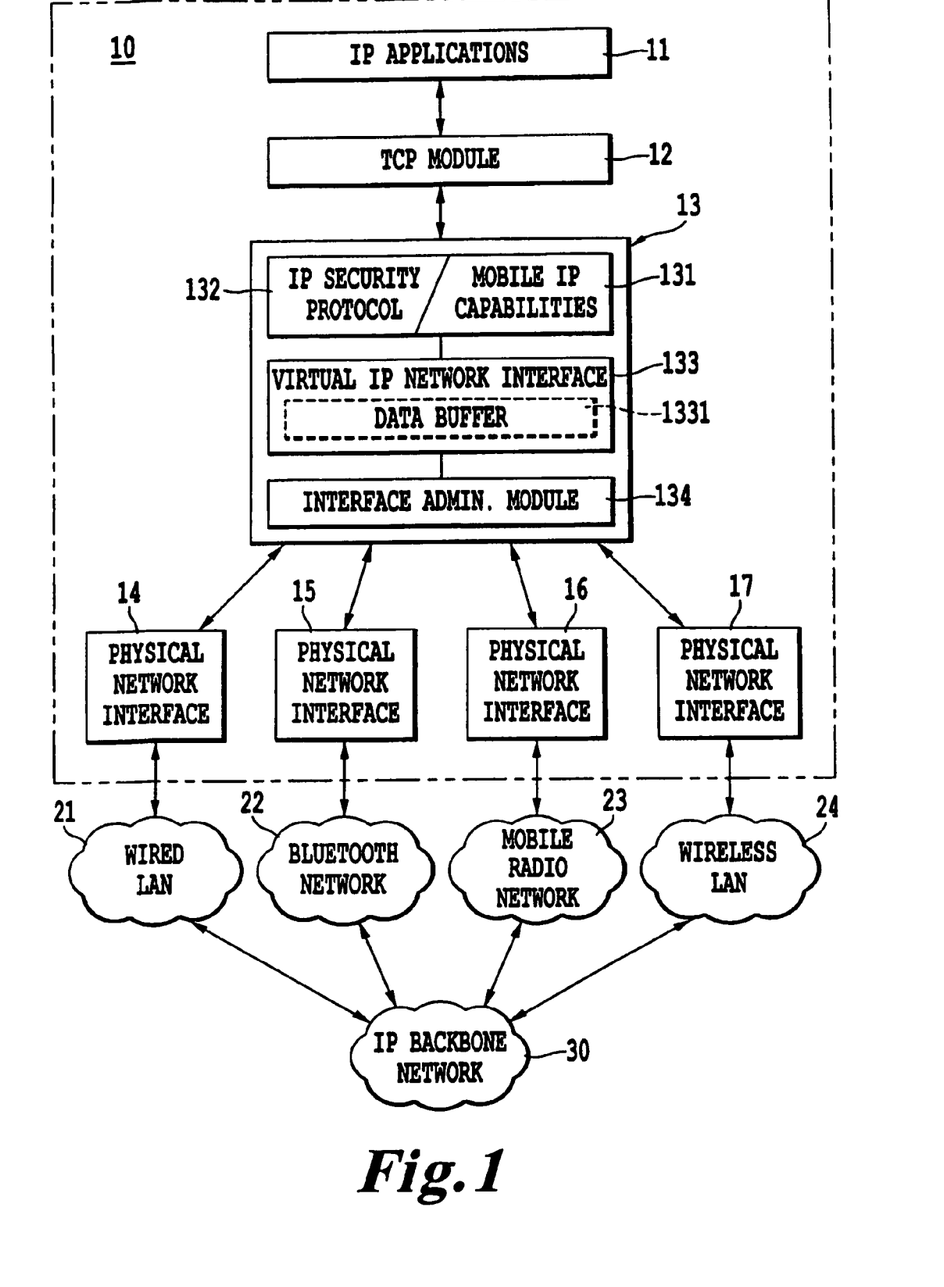
FIG. 1 shows a block diagram illustrating schematically a method and a system for mobile IP nodes in heterogeneous networks.

FIG. 1 illustrates an architecture which can be used to achieve the invention. The reference numeral 10 in FIG. 1 refers to a mobile node having the necessary infrastructure, including hardware and software components and/or units, to achieve a described method and/or system according to the invention. To be understood as mobile nodes 10 are inter alia all possible so-called Customer Premise Equipment (CPE) intended for use at various network locations and/or in different networks. The mobile CPEs or nodes 10 possess one or more different physical network interfaces 14 to 17, which can also support a plurality of different network standards 21 to 24. The physical network interfaces 14 to 17 of the mobile node can comprise e.g. interfaces for Ethernet or for another wired LAN (Local Area Network), Bluetooth, GSM (Global System for Mobile Communication), GPRS (Generalized Packet Radio Service), USSD (Unstructured Supplementary Services Data), UMTS (Universal Mobile Telecommunications System) and/or WLAN (Wireless Local Area Network), etc. The reference numerals 21 to 24 accordingly stand for the various heterogeneous networks, such as e.g. a wired LAN 21, i.e. a local fixed network, in particular also the PSTN (Public Switched Telephone Network), etc., a Bluetooth network 22, e.g. for installations in covered-over localities, a mobile radio network 23 with GSM and/or UMTS, etc. or a wireless LAN. The interfaces 21 to 24 can be not only packet-switched interfaces, as used directly by network protocols such as e.g. Ethernet or Token Ring, but also circuit-switched interfaces which can be used by means of protocols such as e.g. PPP (Point-to-Point Protocol), SLIP (Serial Line Internet Protocol) or GPRS (Generalized Packet Radio Service), i.e. which interfaces do not have, for example, any network addresses such as a MAC or a DLC address. The reference numeral 30 designates the usual, worldwide IP backbone network. As partly mentioned, the communication can take place via the mobile radio network 23, for example by means of special short messages, e.g. SMS (Short Message Services), EMS (Enhanced Message Services), over a signaling channel such as e.g. USSD (Unstructured Supplementary Services Data) or other technologies such as MExE (Mobile Execution Environment), GPRS (Generalized Packet Radio Service), WAP (Wireless Application Protocol) or UMTS (Universal Mobile Telecommunications System) or over a service channel. At the level of the mobile node 10, the method and system according to the invention is based on three main layers or respectively main modules 131 to 133 which are designated jointly as mobile module by the reference numeral 13 in FIG. 1. The layers 131 to 133 can be achieved together or separately, it being possible to achieve them accordingly through software and/or hardware. The first layer comprises a mobile IP module 131 and/or an IPsec module 132. The main task of mobile IP consists in authenticating the mobile node 10 in the network and of redirecting the IP packets having the mobile node 10 as destination address correspondingly. The mobile IP capabilities 131 can preferably be combined with the security mechanisms of an IPsec (IP security protocol) module 132 in order to ensure secure mobile data management in the public Internet 30. As an embodiment variant, the modules of mobile IP 131 and of IPsec 132 can also be implemented jointly in a single Sec MIP module 131/132 (Secure Mobile IP module), as is shown in FIG. 1. The way of functioning of the mobile IP module and of the IPsec module will be described in more detail further below. The SecMIP module administers the data tunnels of mobile IP 131 and IPsec 132 in order to facilitate a useful collaboration between a layer situated above, e.g. a TCP module 12 or respectively IP applications 11 running on the mobile node 10, and a layer 134 lying beneath.

In particular, the SecMIP module checks and coordinates the temporal sequence of operations of the mobile IP module 131 and of the IPsec module 132. For mobile IP, as for IP, which network standard or network type is used for the network link does not matter as long as the Internet protocol is supported. Thus, in principle, it allows the mobile node 10 to move in heterogeneous networks 21-24.

With mobile IP, a home agent dynamically assigns a temporary care-of address to a static home address if the corresponding mobile node 10 is moved in the heterogeneous networks. As mentioned, the dynamic care-of address indicates the topologically current network location of the mobile node whereas the home address designates the location in the home network. In other words, the current location of the assigned mobile node 10 is thus always registered with the home agent. At the same time the home agent redirects the IP data packets having the IP home address of the mobile node as destination address to the care-of address of the mobile node so that the home agent functions like a relay station to the mobile node 10. Mobile IP achieves these functions building upon the normal IP (Internet Protocol). This is to be described more closely in the following: In IP, data packets are directed (routed) from a starting address (source address) of a network interface via various routers in the network to a target address (destination address) of a network interface. The data packets can thereby be taken apart by the individual routers (e.g. in order to be able to overcome heterogeneous network structures), routed to the destination address via different paths, held back, or even rejected. The great flexibility of IP is founded on these basic functions. The routers pass on the data packets based on routing tables, which typically contain the next hop information, i.e. information about which is (are) the next router(s) to head for based on the reference numbers of the networks in the destination address. The reference numbers of the networks can be learned from the low order bits of the IP address in the IP header of the data packet. The destination address in the data packets thus specifies the precise location of the destination network interface in the network. In order to be able to maintain the existing IP transport structure, the same IP address must be able to be kept in the mobile node 10. If, as mentioned, the TCP (Transport Control Protocol) is used in addition to the IP (which is the case in the vast majority of IP links), the connections are further designated by a number quadruplet containing indications about the IP address and port number as well as the start address and the destination address. If one of these four numbers is changed, this causes an interruption of the IP connection. With mobile network use, however, the correct routing of the data packets depends upon the momentary location of the mobile node 10 in the network 21-24 and 30. To change the routing, the IP address of the momentary location can be assigned to the data packets, and, to be more precise, in such a way that the TCP functions are also not disturbed. In mobile IP, these problems are resolved through the assignment of the described two IP addresses, the home address and the care-of address. The home address is static, and indicates the home location of the mobile node 10. It is also used e.g. to flag the TCP connection. The care-of address changes with each new location of the mobile node 10 in the network. It is the topologically significant address of the mobile node 10 with respect to the network topology. On the basis of the home address, the mobile node 10 is able to receive data in a continuously accessible way at the location of its home address in the home network. At the home address the mobile node 10 needs a further network node, however, which is typically designated as the home agent. If the mobile node 10 is not itself located in the home network, the home agent collects the data packets having the mobile node 10 as the destination address and redirects them to the current address of the mobile node 10. Wherever the mobile node is located, a mobile IP module of the mobile node 10 will immediately register with the home agent, upon use, the new or respectively current address of the mobile node 10. During redirecting of the data packets by the home agent, it will be necessary for the destination address of the data packets that corresponded to the home address to be replaced by the momentary care-of address and the data packets to be forwarded. When the data packets have arrived at the mobile node, the reverse transaction takes place in that the destination address, then corresponding to the care-of address, is replaced by the home address. This way the arriving data packets in the mobile node 10 can be further processed through the Transfer Control Protocol (TCP), or another super-ordinate protocol, without error message. For redirecting the data packets from the home address to the care-of address, the home agent constructs a new IP header for the corresponding data packet, which, as mentioned, comprises as the destination address the care-of address instead of the home address. The new IP header surrounds the original data packet as a whole, whereby the old destination address has no effect on the further routing anymore until the data packet has arrived at the mobile node. Such an encapsulation is also referred to as tunneling of data, which describes how the data are tunneled through the Internet by circumventing the effect of the original IP header. Mobile IP thus comprises as essential functions determination of the momentary IP address (care-of address) of the mobile node 10, registration of the care-of address with the home agent and tunneling of the data packets having the home address as the destination address to the care-of address. For further mobile IP specifications, also see e.g. IETF (Internet Engineering Task Force) RFC 2002, IEEE Comm. Vol. 35, No. 5, 1997, etc. Mobile IP supports in particular IPv6 and IPv4.

IPsec (IP security protocol) generates packet-wise or socket-wise authentication/confidentiality mechanisms between network nodes which both use Ipsec. IPsec consists of different, separate protocols with corresponding control mechanisms. IPsec comprises an authentication header (AH), an Encapsulating Security Payload (ESP), an IP payload compression (IPcomp) as well as an Internet Key Exchange (IKE). By means of the AH, IPsec generates an authentication guarantee for the data packets in that the data packets are assigned an extremely encrypted data check sum. With the AH, the authenticity of the sender can be verified, and at the same time it can be checked whether the data packet has been modified in the meantime by an unauthorized third party. The ESP encryption guarantees furthermore the confidentiality of the data in that the data packets are encrypted with a key. This guarantee exists of course only if the key has not been made accessible to third parties. As described above, AH as well as ESP require keys which are is known to both participating network nodes. IKE is ultimately a mechanism for agreeing upon such secret keys between two accounts without the keys becoming known to third parties. The IKE mechanisms form an optional part of the IPsec since they can also be determined manually for AH and ESP. One of the flexible features of IPsec consists in particular in that configuration can be packet-wise as well as for individual sockets. IPsec supports IPvx, in particular IPv6 and IPv4. For more detailed IPsec specifications, see e.g. Loshin, Pete, *IP Security Architecture*, Morgan Kaufmann Publishers, November 1999, or James, S., *A Technical Guide to IPsec*, CRC Press, LLC, December 2000, among other works. Although IPsec has been described in this embodiment example as an example for the application of security protocols according to the present invention, all possible other security protocols or mechanisms or even the omission of security protocols are conceivable according to the invention.

The physical network interfaces 14-17 are administered through an interface administration module 134, which represents the third of the said layers. The virtual IP network interface 133 (designated as the virtual L2/L3 layers in FIGS. 7 to 9) can be generated, for instance, by the interface administration module 134 through software. It is achieved as the buffer between the first layer 131/132, i.e. the SecMIP module, and the third layer 134, i.e. the interface administration module. The virtual network interface 133 generates, on the one hand, vis-à-vis the IP applications 11 or respectively the TCP layer 12, a permanent IP network interface, and is attached, on the other hand, via the interface administration module 134, to the current physical interface of the mobile node 10 with the current care-of address. The interface administration module 134 checks the mobile node 10 for available physical network interfaces 14-17, draws up a lookup table thereby with the available and configurable physical network interfaces 14-17, and links itself to one of the available physical network interfaces 14-17. The checking of the physical network interfaces 14-17 can take place e.g. periodically, i.e. after expiration of a determinable time slot, can be configurable manually or upon request from one of the layers shown in FIG. 1 or from the kernel of the mobile node 10. The checking can be performed by an appropriate software and/or hardware unit and/or module. The lookup table can comprise in particular information such as possible data throughputs, network availability, network stability, costs of network utilization, etc. The lookup table can be drawn up by an appropriate software and/or hardware unit and/or module. The connection to a particular physical interface 14-17 can take place with reference to determinable criteria based on information stored in the lookup table. In particular, it can make sense for the interface administration module 134 to change and update automatically the physical interface 14-17 based on information from the lookup table. The connection to a particular physical interface 14-17 can also be determinable by the user, for example, and/or take place manually. As mentioned, during any desired change or during interruptions, i.e. time when no physical interface 14-17 at all is available, e.g. during an interim removal of the network card from the mobile node 10, the virtual IP network interface remains as the permanently available IP interface. The available physical network interfaces can be configured dynamically, e.g. by means of a DHCP service (DHCP: Dynamic Host Configuration Protocol), if such means are available, or statically, e.g. by the user or based on pre-given configuration profiles. Via the thus generated permanent virtual IP interface, one or more IP applications 11 of the mobile node 10 can now access the heterogeneous networks 21-24. If the mobile node 10 changes the physical network interface 14-17 or its topological location in the network, the connection to the physical network interface can be updated via the interface administration module 134 based on information from the lookup table without anything having to change for the mobile IP module 131 since the virtual IP interface 131 is not affected by the change. The IPsec module 132 thereby updates the IPsec data tunnel configuration according to the current network connection, after which the mobile IP module 131 registers the new care-of address with the home agent so that the routing of the data packets to the new location of the mobile host takes place, and updates the IP configuration if necessary at the home agent according to the momentary physical network interface. The sequence stated above is according to the invention, but it can also take place in reverse order.

It remains to be mentioned that, in an extended embodiment example of that described above, outgoing IP data packets are able to be buffered in a data buffer 1331 of the mobile node 10 if the network connection of the mobile node 10 is interrupted, so that the output data rate of the one or more IP applications 11 can be maintained by means of the data buffer 1331 for a particular buffer time or within a particular fluctuation tolerance, i.e. as long as the storage capacity of the data buffer 1331 suffices for storing the data packets. Therefore if the interruption of the network link lies within the time slot for a connection timeout provided for in the TCP, for instance, the output data rate for the IP applications 11 can be maintained such that no automatic deceleration of the output rate through the IP applications takes place. The storing of the data packets can occur continuously at the same rate, for example, or can slow down steadily based on the duration of the interruption. It is to be pointed out that the data buffer 1331 can play an important role, particularly with real-time applications, in minimizing interruptions and data loss during a change of the topological network location. In an embodiment example, the data buffer 1331 can be achieved assigned to the virtual network interface 131 or integrated, through hardware or software; it can also be achieved separately in the mobile IP node, however.

Figure 2:
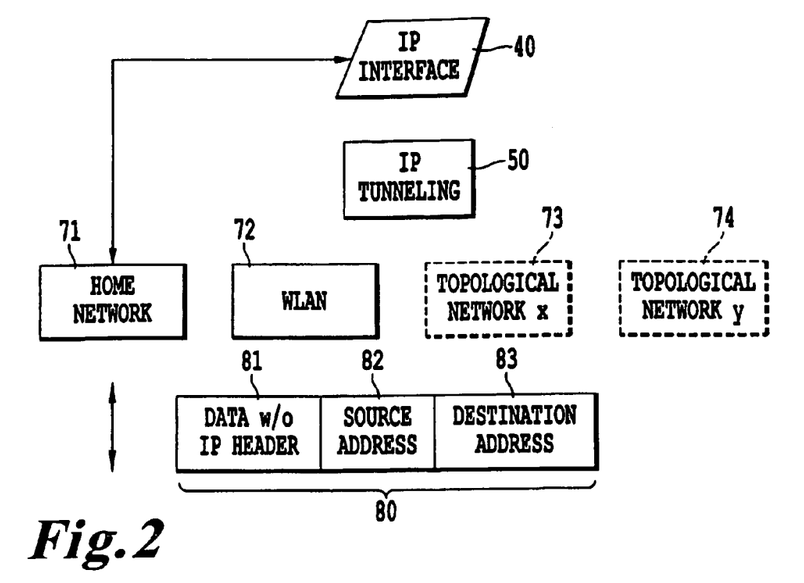
FIG. 2 shows a block diagram illustrating schematically mobile IP in a mobile node without virtual network interface according to the invention, the mobile node being located in the home network, i.e. in the network of the home address.
Figure 3:
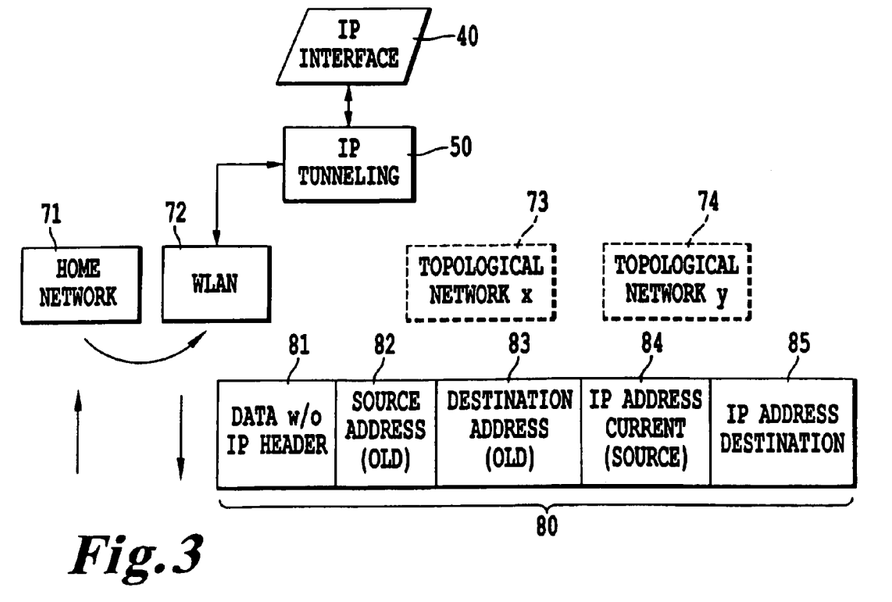
FIG. 3 shows a block diagram illustrating schematically mobile IP in a mobile node without virtual network interface according to the invention, the mobile node being located in a network other than its home network.

FIGS. 2 and 3 show normal mobile IP without the method according to the invention or the system according to the invention. In FIG. 1, the mobile node is located in the home network 71. The reference numerals 72 to 74 each designate different topological network locations. These can also be heterogeneous networks. For example, the home network 71 can be an Ethernet-LAN-link, 72 a WLAN (Wireless Local Area Network) link, etc. Outgoing data packets have as the destination address the IP address of the destination node in the network 30. Mobile IP is not necessary, and no mobile IP tunneling 50 takes place. The IP interface 40 of the mobile node sees the received data packets 80 without their having been modified, i.e. the source address 82 indicates the IP address of the sender and the destination address 83 indicates the home IP address of the mobile node. With respect to their IP header, the sent data packets 80 have reverse-order IP address sequences. The reference numeral 81 designates the co-transmitted data without IP header. In FIG. 3 the mobile node is not located in the home network 71, but instead at a topologically different network location, for instance in the WLAN 72. In the case of the sent data packets 80, the source address 84 now indicates the IP address of the topologically current network location, while the destination address 85 indicates the IP address of the corresponding destination node. In the case of the received IP data packets, the reverse-order new IP header is assigned by the home agent to the data packets 80, whereby the old header with the old address 82/83 is located encapsulated underneath. The reference numeral 81 here, too, designates the co-transmitted data without IP headers. In the sent and received data packets 80, the source addresses 82/84 and the destination addresses 83/85 are correspondingly interchanged.

Figure 4:
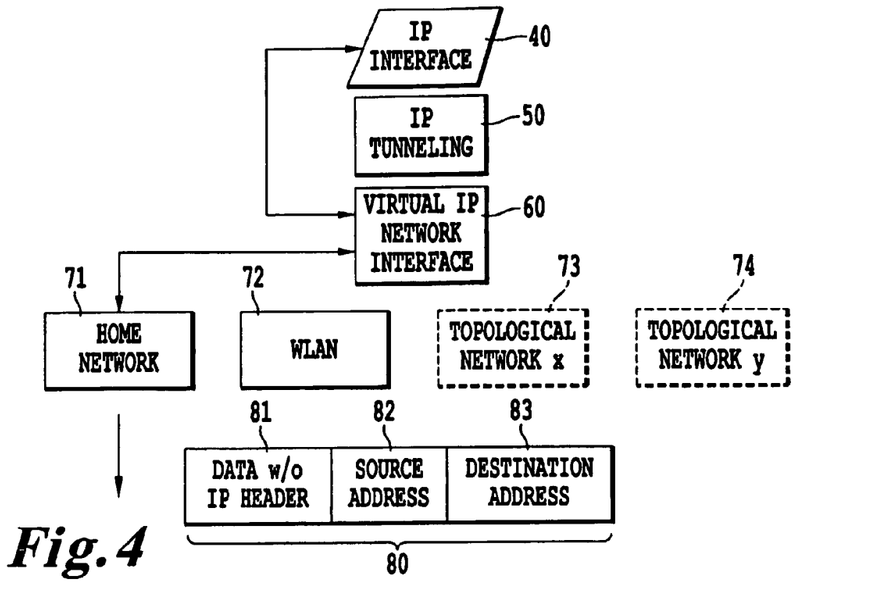
FIG. 4 shows a block diagram illustrating schematically mobile IP in a mobile node with a virtual network interface according to the invention, the mobile node being located in the home network, i.e. in the network of the home address.
Figure 5:
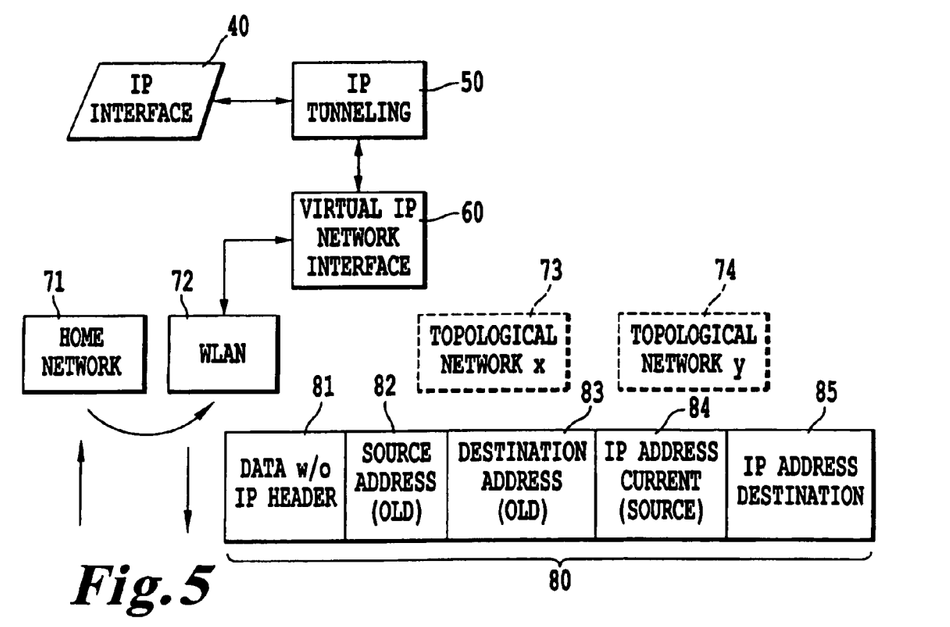
FIG. 5 shows a block diagram illustrating schematically mobile IP in a mobile node with a virtual network interface according to the invention, the mobile node being located in a network other than its home network.

FIGS. 4 and 5 show mobile IP with the method according to the invention or the system according to the invention, i.e. with the inventive virtual IP interface 60. The reference numerals having the same digits in FIGS. 4 and 5 designate the same objects as in FIGS. 2 and 3, and are thus not further described here. If the mobile node is located in the home network 71 (see FIG. 4), then the virtual IP interface 60 takes over the home address of the mobile node, and the home agent has nothing more to do, i.e. mobile IP is not necessary and mobile IP tunneling does not take place. The virtual IP network interface 60 of the mobile node sees the received data packets 80 without their having been modified, i.e. the source address 82 indicates the IP address of the corresponding node, and destination address 83 indicates the home IP address of the mobile node. In the case of the sent data packets 80, the destination address 83 indicates the IP address of the corresponding destination node in the network, while the source address 82 indicates the IP address of the virtual IP network interface, which corresponds to the home IP address of the mobile node. The reference numeral 81 designates the co-transmitted data without IP header. In FIG. 5, the mobile node is not located in the home network, and the data packets contain in the IP header the topologically current IP address 71 as the source or respectively destination address 84/85, depending upon whether they are sent or received. The virtual IP network interface 133 according to the invention therefore takes over in each case the IP address of the momentarily current physical interface 14-17, whereby the mobile IP module 131 takes over the management of the IP addresses of the IP header of the data packet 80 and the generation of the data tunnel (if necessary) in the conventional way. At the same time the virtual IP network interface 133 ensures the permanent presence of an interface vis-à-vis the IP applications.

It is important to state that the virtual IP interface, as an embodiment variant, can be connected not only to one physical interface but to a plurality of physical interfaces at the same time. Thus it is then possible for the mobile node 10 to receive simultaneously the same data packet via two physical interfaces, for example. Redundant IP data packets are automatically recognized in higher IP layers, and are reduced accordingly. Through the simultaneous sending of IP data packets and the parallel receiving of the same IP data packets by two physical interfaces, the seamless transition from one physical interface to another by the mobile node 10 can be ensured. In this method a mobile node 10 is assigned at least two care-of addresses corresponding to the physical interfaces momentarily connected to the virtual IP interface. If more than two physical interfaces are connected at the same time, the number of assigned care-of addresses increases correspondingly. The home agent routes the IP data packets having the home address of the mobile node 10 in the IP header according to the previously described multiple registration in parallel to the different registered care-of addresses, i.e. to different physical interfaces of the mobile node 10.

Figure 6:
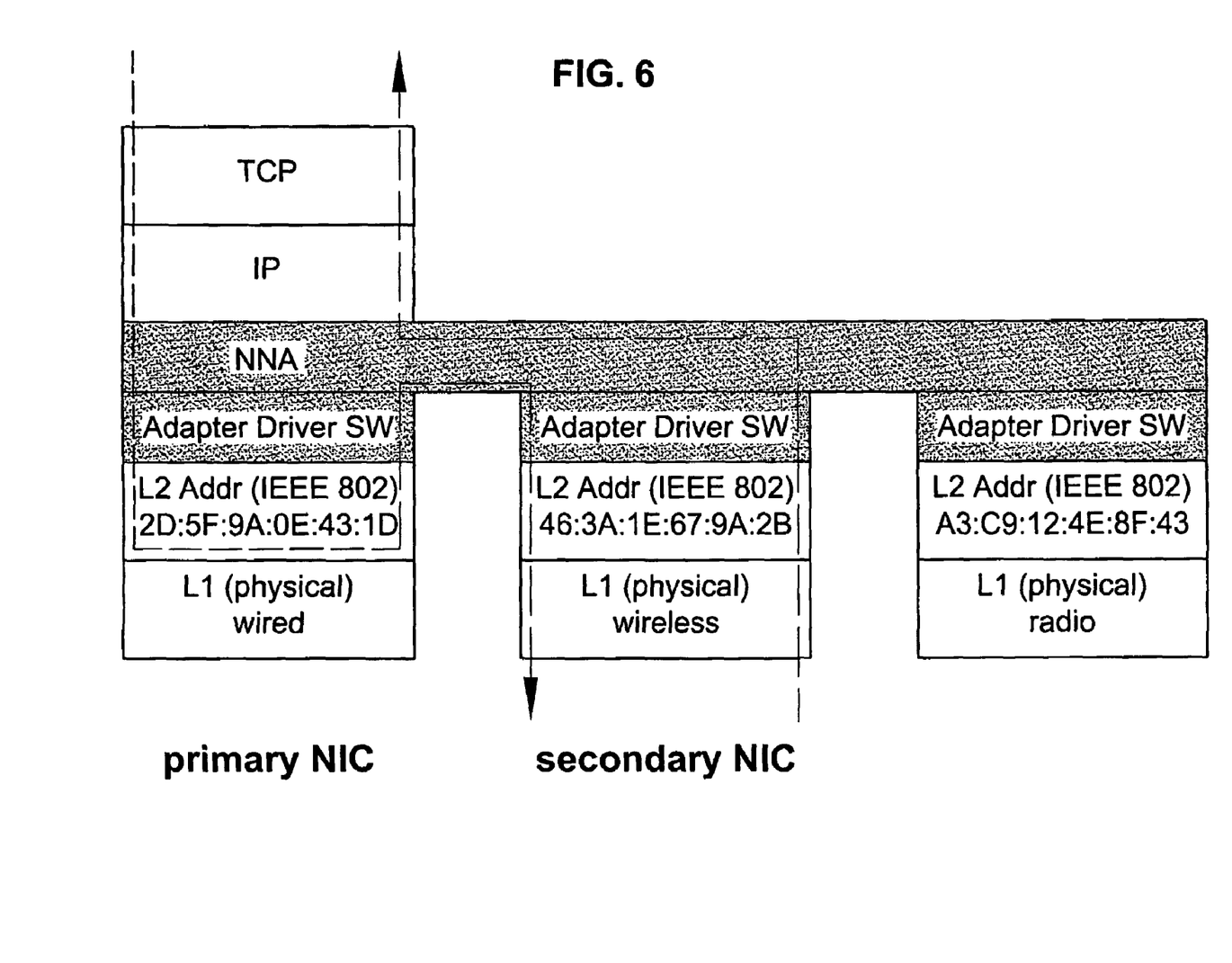
FIG. 6 shows a block diagram reproducing schematically a solution of the state of the art by means of the described NAA (Network Access Arbitrator).

FIG. 6 shows a solution of the state of the art such as is shown in the patent publication EP 1 089 495, for example. A so-called Network Access Arbitrator (NAA) thereby sees to it that the different MAC addresses(L2 Addr (IEEE 802) 2D:5F:9A:0E:43:1D, L2 Addr (IEEE 802) 46:3A:1E:67:9A:2B, L2 Addr (IEEE 802) A3:C9:12:4E:8F:43) of the individual available physical network interfaces (L1 (physical) wired, L1 (physical) wireless, L1 (physical) radio) are redirected via a single fixed MAC address (L2 Addr (IEEE 802) 2D:5F:9A:0E:43:1D). This first MAC address is the address of the so-called primary NIC, while all other physical interfaces are each secondary NICs. The NAA connects the L2 layer of the accessible NICs in that it redirects the data packets from the primary NIC to the corresponding MAC address of a further network interface (secondary NIC). No virtual interface is thereby generated, however, but instead the NAA redirects the MAC address via the MAC address of the primary NIC to that of a secondary NIC. The NAA thereby acts as the virtual adapter driver. Thus the outgoing data packets are redirected to the current interface, while incoming data packets are transmitted directly to the IP layer. No virtual network interface is generated therefore with the NAA, but instead the NAA simply redirects the data packets. As is seen clearly in FIG. 6, the NAA needs at least one physical interface with a MAC address, namely the primary NIC, in order to function. If the primary NIC is removed, the IP applications lose their connection to the layer L2 since the NAA is redirecting via the primary NIC.

Figure 7:
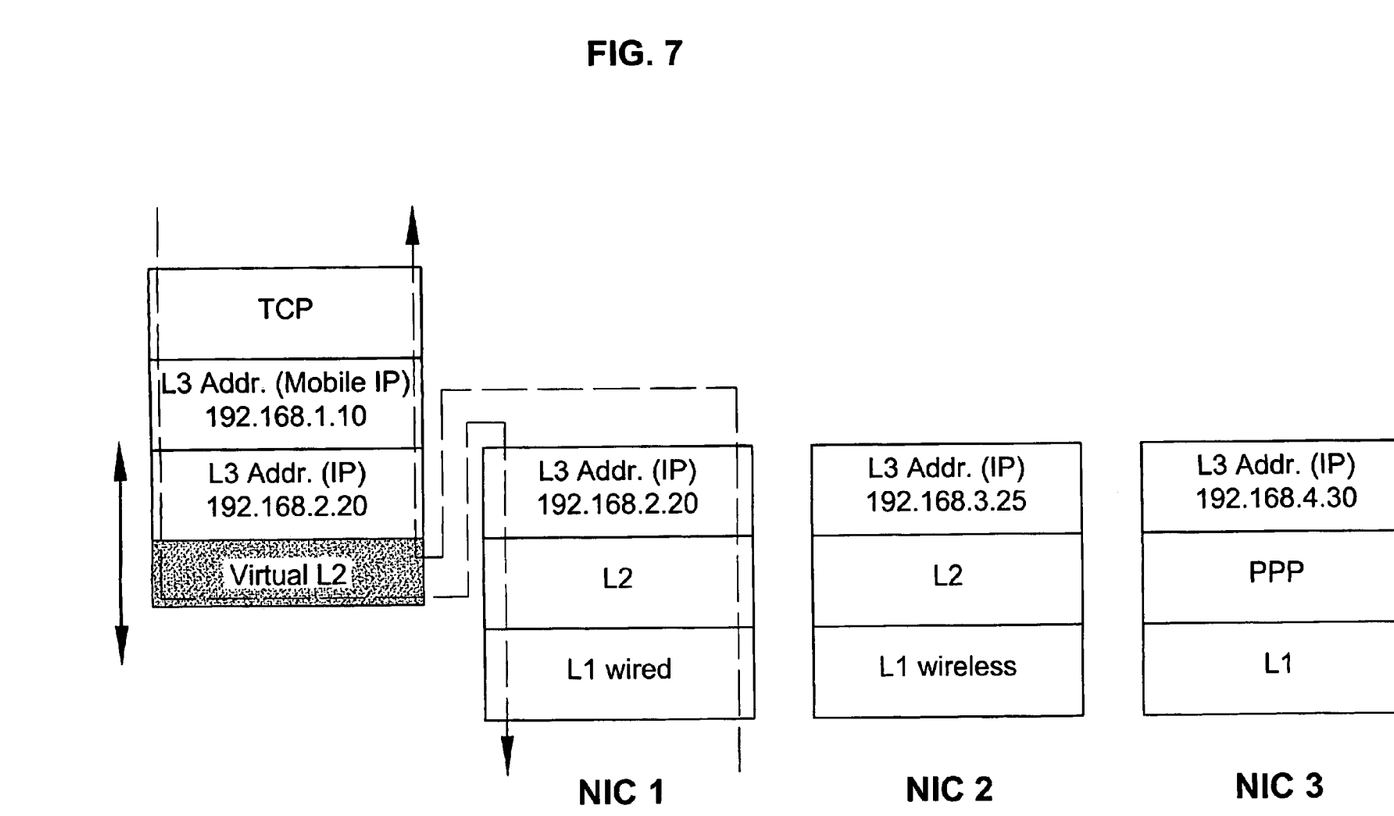
FIGS. 7/8/9 each show a block diagram reproducing schematically a solution according to the invention by means of a virtual IP layer or respectively virtual IP device and making clear the difference to the state of the art according to FIG. 6.
Figure 8:
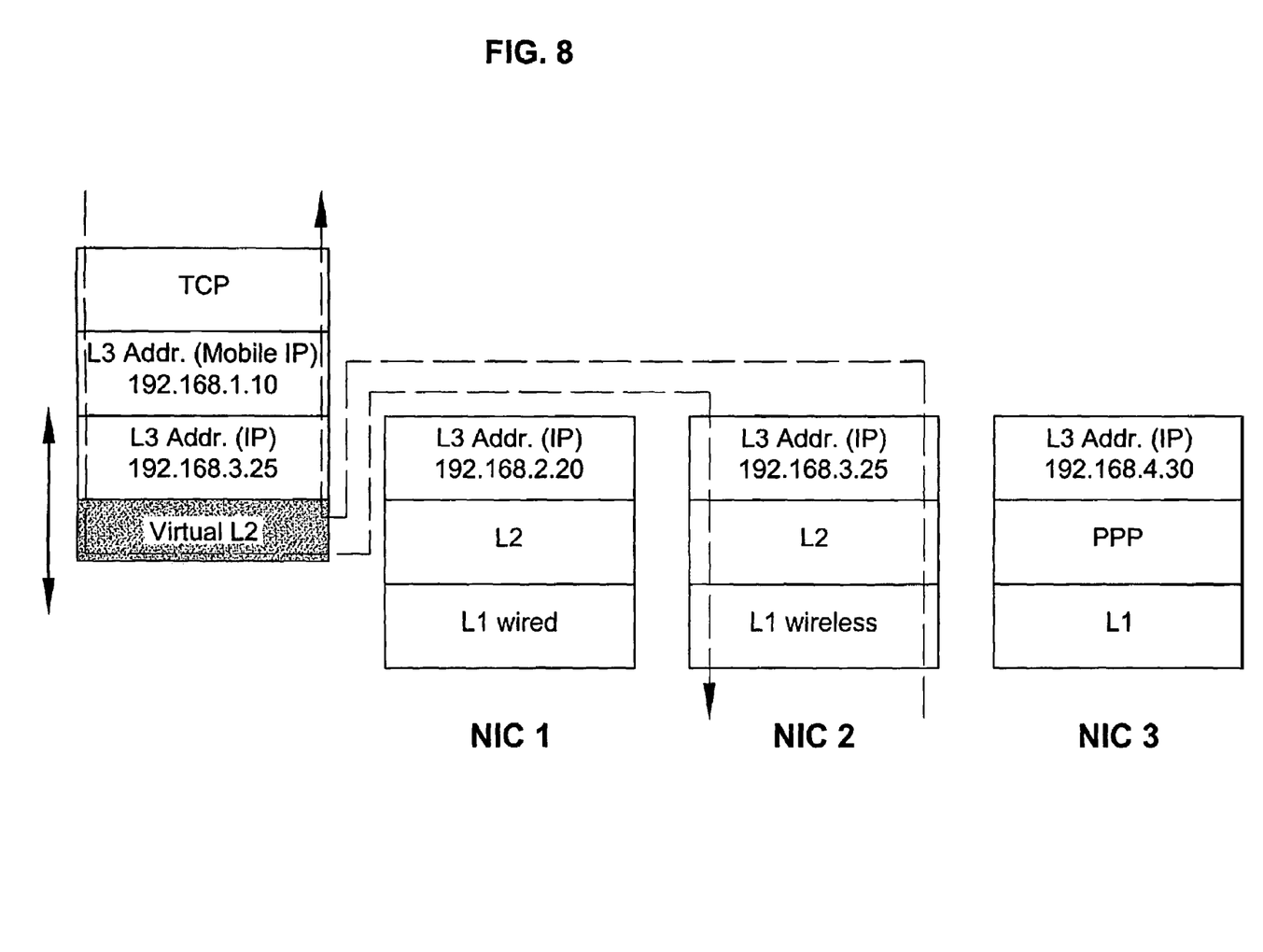
Figure 9:
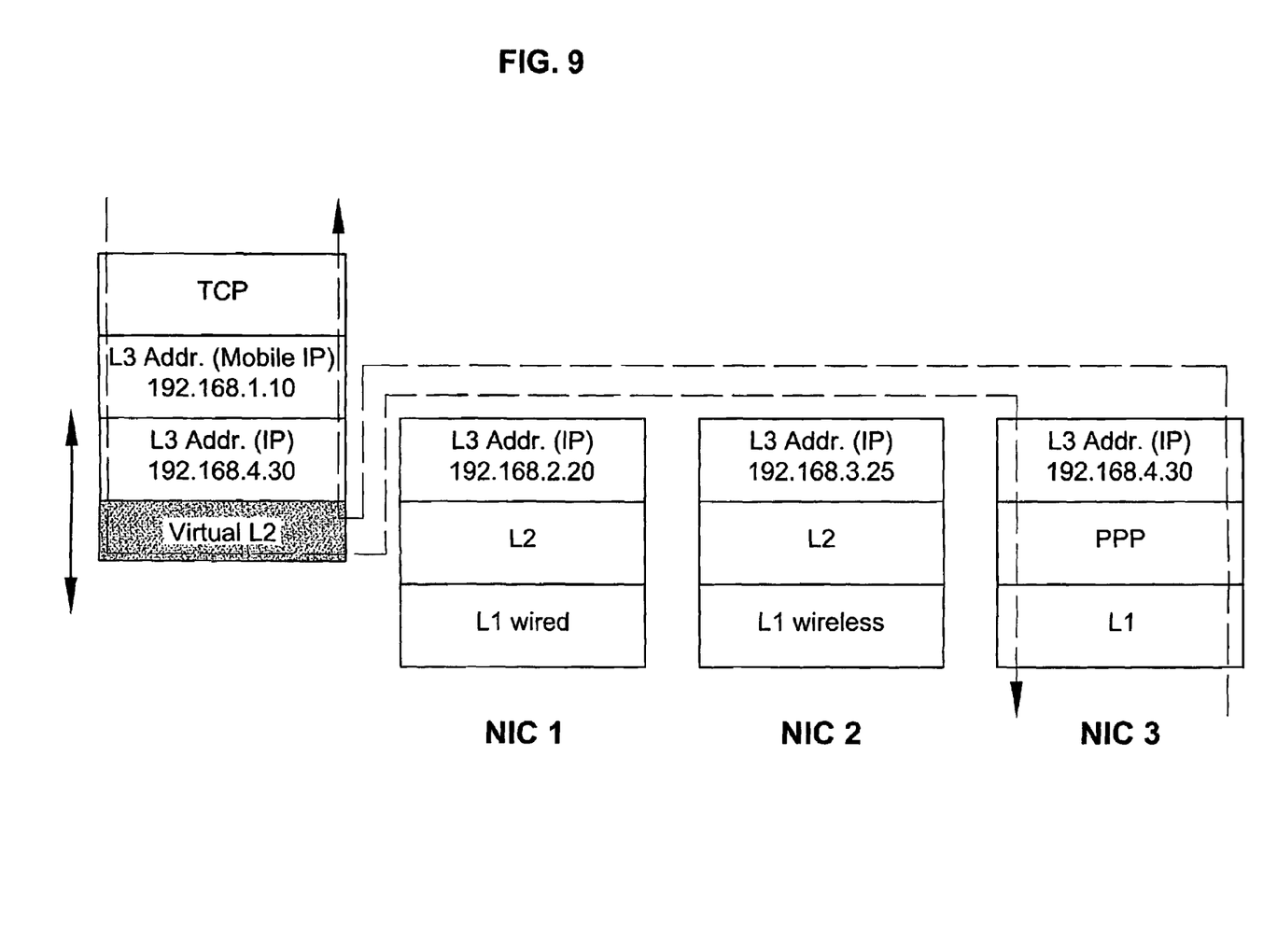

FIGS. 7, 8 and 9 each show a block diagram reproducing schematically a solution according to the invention by means of a virtual IP layer or respectively IP device, and make clear the difference to the state of the art according to FIG. 6. In contrast to the state of the art from FIG. 6, a genuine virtual interface 133 is generated. The interface administration module 134 (not shown in FIGS. 7 to 9) links the respective physical interface 14-17 to the virtual interface 133, while the IP applications access the virtual IP interface 133 via the IP layer. The virtual IP interface 133 is permanently maintained by the interface administration module 134, independently of whether a physical network interface 14-17 is accessible at all. The running IP applications thus always find the IP interface 133 there, no interruption occurring during a change of interface. It clearly follows from FIGS. 7 to 9 that in the present invention more than just a mere rerouting of data packets is involved, and instead a genuine virtual IP interface 133 is generated. In particular the accessing of a higher level of abstraction, i.e. of layer, has in addition the advantage that one is independent of standards, such as hardware address, for example.

The invention claimed is:

1. A computer-readable medium including computer program instructions which cause a computer to execute a method of assigning IP addresses to mobile IP nodes in heterogeneous networks in which a home agent dynamically assigns a temporary IP care-of address to a static IP home address when a mobile node is moved in the heterogeneous networks, the dynamic care-of address indicating the topologically current network location of the mobile node and IP data packets having the IP home address of the mobile node as a destination address being redirected to the care-of address of the mobile node, said method comprising:

checking the mobile node for available configurable physical network interfaces, generating a lookup table with the available and configurable physical network interfaces, linking an interface administration module to one of the available configurable physical network interfaces, accessing the heterogeneous networks via a permanent virtual IP network interface generated in the mobile node, the generated permanent virtual IP network interface being linked to the topologically current network indicated by the dynamic care-of address, and including a generated virtual L3 layer and a generated virtual L2 layer, and updating, during a change of the physical network interface of the mobile node, the link of the permanent virtual IP network interface to the network based on the lookup table.

2. The computer-readable medium according to claim 1, wherein the checking step is completed periodically.

3. The computer-readable medium according to claim 1, wherein the updating step is completed automatically.

4. The computer-readable medium according to claim 3, wherein criteria for the automatic updating of the physical interface is determined by a user.

5. The computer-readable medium according to claim 1, further comprising instructions which cause the computer to execute a method comprising:

buffering outgoing IP data packets when the network link of the mobile node is interrupted, so that the output data rate of the one or more IP applications is maintained or is kept within a particular fluctuation tolerance.

6. The computer-readable medium according to claim 3, further comprising instructions which cause the computer to execute a method comprising:

buffering outgoing IP data packets when the network link of the mobile node is interrupted, so that the output data rate of the one or more IP applications is maintained or is kept within a particular fluctuation tolerance.

* * * * *